United States Patent
Liu et al.

(10) Patent No.: US 11,819,799 B2
(45) Date of Patent: Nov. 21, 2023

(54) COMPACT ABSORPTION COLUMN FOR $CO_2$ CAPTURE

(71) Applicant: University of Kentucky Research Foundation, Lexington, KY (US)

(72) Inventors: Kunlei Liu, Lexington, KY (US); Heather Nikolic, Stamping Ground, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 213 days.

(21) Appl. No.: 17/164,481

(22) Filed: Feb. 1, 2021

(65) Prior Publication Data

US 2021/0236985 A1 Aug. 5, 2021

Related U.S. Application Data

(60) Provisional application No. 62/968,232, filed on Jan. 31, 2020.

(51) Int. Cl.
*B01D 53/18* (2006.01)
*B01D 53/14* (2006.01)

(52) U.S. Cl.
CPC ....... *B01D 53/185* (2013.01); *B01D 53/1475* (2013.01); *B01D 2252/204* (2013.01)

(58) Field of Classification Search
CPC .............. B01D 53/185; B01D 53/1475; B01D 2252/204
USPC ....................................................... 423/228
See application file for complete search history.

(56) References Cited

U.S. PATENT DOCUMENTS

| | | | | |
|---|---|---|---|---|
| 2006/0185517 A1* | 8/2006 | Nagel | ................ | B01D 53/1406 96/275 |
| 2012/0237420 A1* | 9/2012 | Pellegrin | ............ | B01D 53/1475 422/604 |

OTHER PUBLICATIONS

National Energy Technology Laboratory (NETL) et al, "Cost and Performance Baseline for Fossil Energy Plants, US Dept of Energy-National Energy Technology Laboratory", Office of Fossil Energy, vol. 1a; Bituminous Coal (PC) and Natural Gas to Electricity Revision 3, Jul. 6, 2015, pp. 1-240.
Tidjani Niass et al, "Accelerating Breakthrough Innovation in Carbon Capture, Utilization, and Storage. Report of the Mission1-291 Innovation Carbon Capture", Utilization, and storage Experts' Workshop. Mission Innovation. Sep. 2017, pgs.
Chunbo, Y E et al, "Process Characteristics of CO2 Absorption by Aqueous Monoethnolamine Microchannel Reactor". Chinese Journal of Chemical Engineering. 20 (1) 111-119. 2012.
De Cazenove, Thomas, "Mitigation Solutions to High Amine Emissions Due to Aerosols and Particulates Contained in Oil Refinery Flue Gases". Presentation at Netl CO2 Capture Technology Review Meeting. Pittsburg, PA. Aug. 21-25, 2017, pp. 1-18.
U.S. Department of Energy, "Secretary Perry Announces $24 Million in New Porjects to Advance Transformational Carbon Capture Technologies", Department of Energy announcement ,Feb. 28, 2019 , pp. 1-3.

(Continued)

*Primary Examiner* — Anita Nassiri-Motlagh
(74) *Attorney, Agent, or Firm* — Stites & Harbison PLLC; Warren D. Schickli (57) ABSTRACT

An acid gas absorber includes a co-current flue gas-lean solution section and a packed counter-current flue gas-liquid phase section useful in a method of capturing an acid gas from flue gas in a more efficient and cost effective manner.

12 Claims, 6 Drawing Sheets

(56) References Cited

OTHER PUBLICATIONS

University of Kentucky, "UK CAER Receives $3 Million From DOE to Develope Carbo Capture Technology", University of Kentucky announcement , May 16, 2019 , p. 1.

Univeristy of Kentucky-Center for Applied Energy Research, "Fog+froth-based Post-combustion CO2 Capture in Fossil-fuel Power Plants", University of Kentucky Center for Applied Energy Research Presentation by Heather Nikolic ,Jan. 5, 2021 at the Budget Period 1 Review Meeting, pp. 1-34.

Univeristy of Kentucky-Center for Applied Energy Research, "Using the Carbon Capture Simulation Initiative Tool to Design the Experiments in the Parametric Campaign of a Novel Compact Absorber for Carbon Capture", University of Kentucky Center for Applied Energy Research Presentation by Ishan Fursule and accepted at the 2020 Virtual American Institute of Chemical Engineers (AlChE) Fall Meeting on Nov. 19, 2020, pp. 1-16.

Univeristy of Kentucky-Center for Applied Energy Research, "Reducing the Absorber Cost for CO2 Capture," University of Kentucky Center for Applied Energy Research Presentation by Ishan Fursule on Nov. 20, 2019 at the Fossil Fuel Utilization and Emission Control Review Meeting in Lexington, KY., pp. 1015.

Univeristy of Kentucky-Center for Applied Energy Research,,"Fog+Froth-based Post-combustion CO2 Capture in Fossil-fuel Power Plants," University of Kentucky Center for Applied Energy Research Presentation by Heather Nikolic at the 2019 Carbon Capture, Utilization, Storage, and Oil and Gas Technologies Integrated Review Meeting, Aug. 26-30, 2019, pp. 1-22.

Univeristy of Kentucky-Center for Applied Energy Research, Project Review for meeting—"Fog+Froth-based Post-combustion CO2 Capture in Fossil-fuel Power Plants," Aug. 26, 2019, pp. 1-4.

\* cited by examiner

COMPACT ABSORPTION COLUMN FOR CO$_2$ CAPTURE

RELATED APPLICATION

This application claims priority to U.S. Provisional Patent Application Ser. No. 62/968,232 filed on Jan. 31, 2020 which is hereby incorporated by reference in its entirety.

GOVERNMENT SUPPORT

This invention was made with government support under Grant No. DE-FE0031733 awarded by the U.S. DOE NETL. The government has certain rights in the invention.

TECHNICAL FIELD

This document relates generally to the separation of acid gases from a fluid stream and, more particularly, to a new and improved method and apparatus for that purpose.

BACKGROUND

Figure 1:
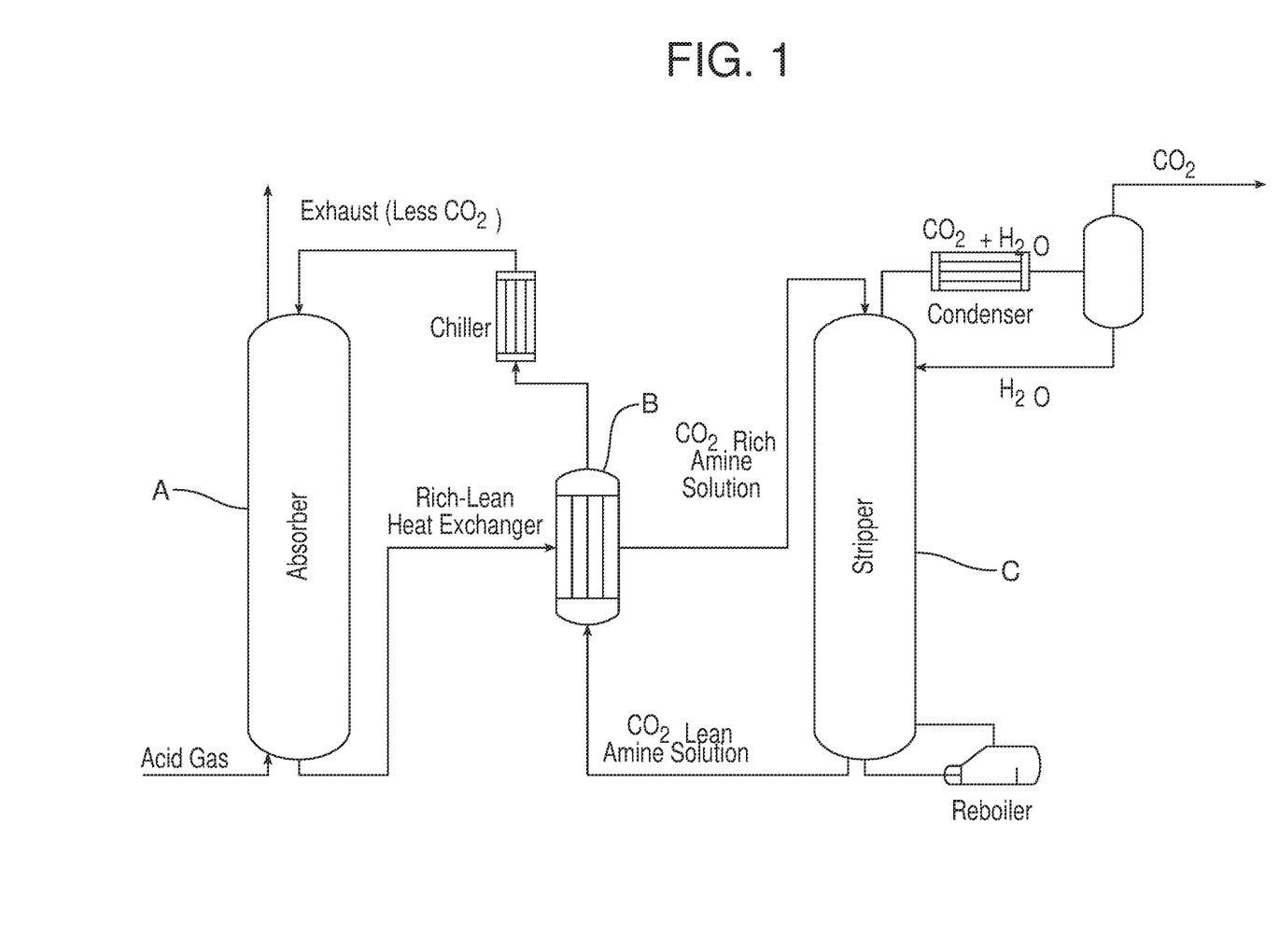
FIG. 1 is a schematic diagram of a state-of-the-art post combustion $CO_2$ capture apparatus that uses aqueous amine solvent as the acid gas capture agent.

The cleanup of acid gasses, such as carbon dioxide (CO$_2$), from natural gas and coal combustion has been an extensively practiced technology. The industrial removal of CO$_2$ from flue gases dates back to the 1930's. While several technologies exist for the removal of acid gasses, one of the most commonly employed practices is the use of aqueous amines. In this process the amine reacts with the CO$_2$ to form a carbamate or bicarbonate salt along with a protonated amine to balance the overall charge. The overall process for a thermal swing absorption process is depicted in FIG. 1. Here, the liquid, CO$_2$ rich amine from the bottom of the absorber A, is passed through a heat exchanger B to improve efficiency before being heated to a higher temperature in the stripper C. The stripper C removes the CO$_2$ as a gas from the amine solution to produce a lean, or CO$_2$ deficient solution. The lean solution is returned to the absorber A by way of the heat exchanger B to repeat the process.

The application of CO$_2$ capture to post-combustion flue gas separation has recently been an area of major concern. Due to the maturity of aqueous amine carbon capture systems, this technology will be the preferred method when new regulations require widespread full-scale deployment of post-combustion carbon capture and storage (CCS) for reducing emissions from fossil fuel combustion. Thus, the market for carbon capture technologies could be enormous with over 1.5 billion tons of CO$_2$ produced annually from coal combustion in the US alone. In the shorter term, Enhanced Oil Recovery (EOR) and utilization in downstream products (polymers or chemicals) is a significant opportunity for marketing technical solutions.

With continued societal and regulatory concern over the global climate change, the market has been driving the post-combustion capture technology development towards commercial scale. However, there is still a need for significant technological advancements and cost reduction strategies to make these systems cost-competitive. Full scale implementation of current carbon capture systems is estimated to increase the overall cost of electricity by 62% from $50.90/MWh to $82.30/MWh, using U.S. Department of Energy Reference Cases B12A and B12B, which are 550 MW net power output, super-critical, pulverized coal combustion cases with and without the Cansolv CO$_2$ capture system applied at a 90% CO$_2$ capture efficiency. [Cost and Performance Baseline for Fossil Energy Plants Volume 1: Bituminous Coal and Natural Gas to Electricity Revision 3, (DOE/NETL-2015/1723), United States Department of Energy (DOE), National Energy Technology Laboratory (NETL), Pittsburgh, Pa., July 2015.]

The capital cost of the CO$_2$ capture system accounts for 62.5% of the increase in the cost of electricity and the CO$_2$ absorber is the single piece of equipment that accounts for most of the capital cost, representing up to 50% of the total capital cost according to the 2017 National Energy Technology Laboratory Mission Innovation Report. [Accelerating Breakthrough Innovation in Carbon Capture, Utilization, and Storage. Report of the Mission Innovation Carbon Capture, Utilization, and storage Experts' Workshop. Mission Innovation. September 2017.]

To have the biggest effect on the CCS capital cost and therefore the biggest effect on the cost of electricity reducing the cost of the absorber is critical.

SUMMARY

In accordance with the purposes and benefits set forth herein, a new and improved method and apparatus are provided for the capture of the acid gas carbon dioxide from flue gas.

In a conventional CO$_2$ absorber A, shown in FIG. 1, the lean solution travels through the absorber A from the top to the bottom by forming a film on the structured or random packing surface. A trayed absorber may also be applied. The flue gas travels up, counter-current to the lean solution, through the void spaces of the packing and CO$_2$ is transferred by an exothermal chemical reaction to the liquid phase at the liquid-gas interface. The CO$_2$ absorption chemical reaction kinetics and diffusion of the CO$_2$ through both the liquid-gas interface and into the bulk liquid phase affect the overall CO$_2$ mass transfer.

The application of counter-current packed beds to post-combustion CO$_2$ capture has yielded many benefits, particularly in the area of energy consumption to regenerate the solvent. However, the significant relative velocity between the gas (upward flow with superficial velocity of 1-1.5 m/s) and liquid (downward flow with velocity of 0.02-0.05 m/s) results in a thickness of liquid film on the packing surface at approximately 600 to 1,000 µm. Diffusion resistance (moving carbon species captured at the gas/liquid interface to the bulk and moving unreacted amine from the bulk to the interface) is the dominant factor to limit mass transfer when the liquid layer thickness is >50 µm for fast reacting solvents, for a majority of second generation and transformative solvents/materials.

Mass Transfer Limitation of a Conventional CO$_2$ Absorber:

For a diffusion-controlled packed bed absorber using any advanced, fast reacting solvent with generally high viscosity, the overall mass transfer coefficient (k$_G$) can be written as $$k_G \propto \frac{\sqrt{D_{CO_2} \cdot k_2 \cdot [\text{amine}]}}{H_{CO_2}}$$

which is determined by the reaction kinetic coefficient, k$_2$, amine concentration, [amine], CO$_2$ solubility, [H$_{CO2}$], and diffusivity, [D$_{CO2}$], where the diffusion coefficient of CO$_2$ would be on the order of 10$^{-9}$ m$^2$/s. Furthermore, the diffusivity between the reaction interface and bulk is determined by the Stokes-Einstein equation $$(D_{CO_2})_{amine\ soln} = (D_{CO_2})_{water}\left(\frac{\eta_{water}}{\eta_{amine\ soln}}\right)^{0.8},$$

where high viscosity increases the diffusion resistance, thereby reducing mass transfer. Consider three reference $CO_2$ absorption solutions, monoethanol amine (MEA), piperazine (PZ) and methyldiethanolamine (MDEA) with properties shown relative to MEA (See Table 1).

TABLE 1

|  | MEA | PZ | MDEA |
| --- | --- | --- | --- |
| Rate Constant | 5.94 | 69.21 | 0.004 |
| Self-concentrated Amine | 1.0 | 3.5 | ~1 |
| Calculated Kg' impact from [M] | 1 | 1.87 | ~1 |
| Calculated Kg' Impact from $k_2$ | 1 | 3.41 | 0.03 |
| Calculated kg' Overall | 1 | 6.39 | 0.03 |
| Measured Mass Flux (WCC@0.1) | 1 | 2.2 | 0.18 |

It might be predicted that PZ, a surface self-concentrated and fast reacting amine, would absorb $CO_2$ 6.39 times faster than MEA, while the MDEA, a much lower energy penalty solvent with slower kinetics, should have only 3% of the MEA $CO_2$ absorption rate. However, wetted wall experimental data show that these predictions are far from reality. In fact, PZ absorbs $CO_2$ 2.2 times faster than MEA, 3 times slower than predicted, but the MDEA absorption rate is 18% of the MEA rate, 6 times better than predicted. For a given reaction surface of wetted wall (similar to a packing surface), it is believed that the PZ consumes the available amine at the gas-liquid interface very quickly, but due to diffusivity resistance, fresh amine for further reaction is not available. Not all the PZ wetted surface area is effective for capturing $CO_2$, while fresh MDEA is available for reaction at the entire wetted surface due to slower kinetics.

Figure 2:
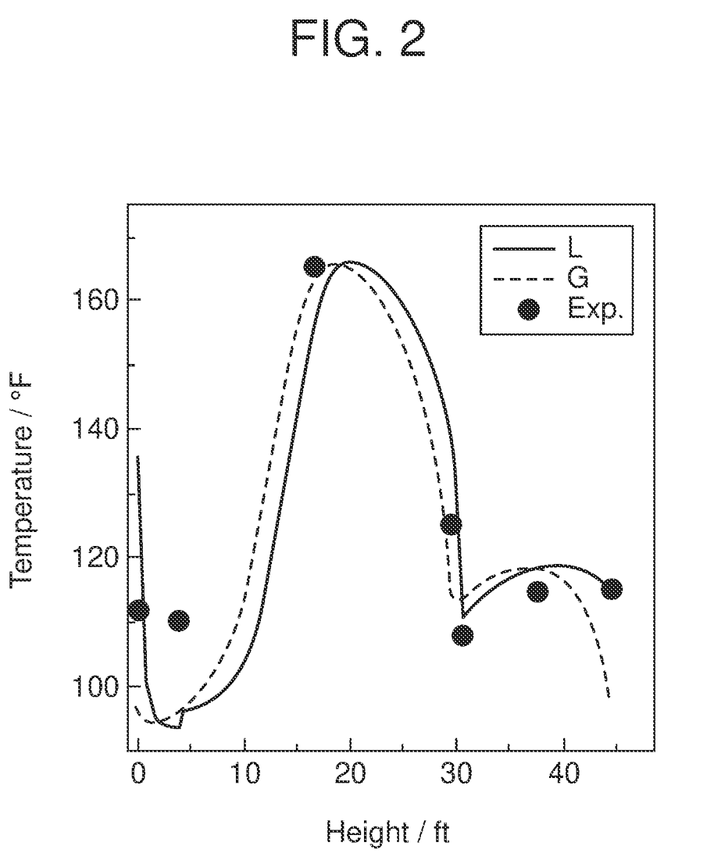
FIG. 2 is a graph of temperature as a function of height in a 0.7 MWe Small Pilot Absorber.
Figure 3:
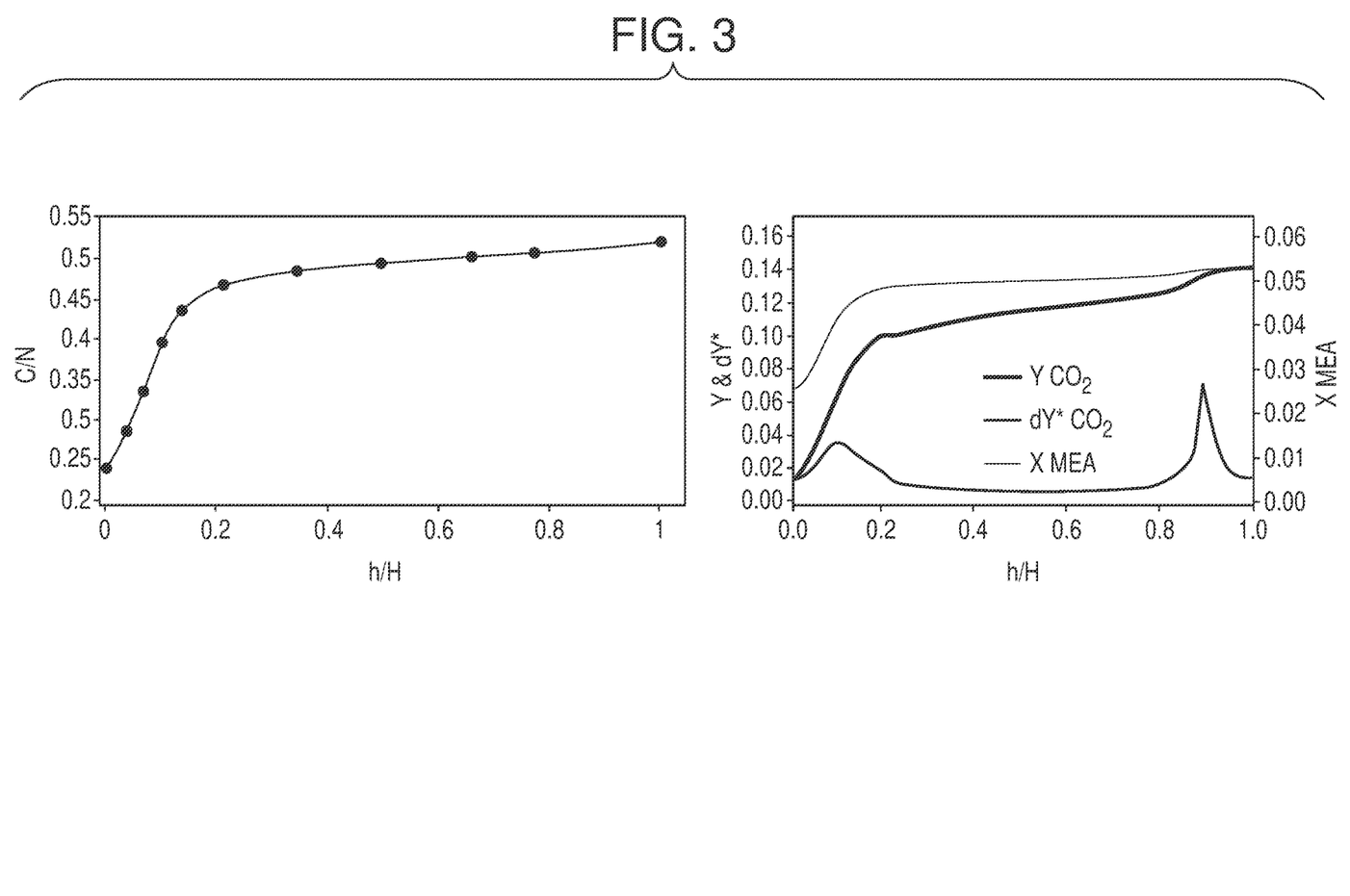
FIG. 3 is a graph illustrating the effectiveness of $CO_2$ absorber along column height where $YCO_2$ is the $CO_2$ gas phase concentration and $dY*CO_2$ is the driving force between the gas and liquid for mass transfer.

Under-Utilized Conventional Absorber Due to Temperature Bulge:

Generally, the diameter of a conventional $CO_2$ absorption column A is determined by the highest flooding point at a given liquid/gas (L/G) ratio, which typically occurs at the temperature bulge, in the top packed section, 10-15% of packing height from the top as shown in FIG. 2. These temperature profiles are confirmed at the UK-CAER 0.7 MWe small pilot CCS, when L/G~3.2, which is typical for advanced solvents. A temperature rise of ~50° F. is observed 10 feet below the lean amine feed. The temperature bulge represents an imbalance in the $CO_2$ absorption rate and the exothermic reaction heat rejection. FIG. 3 shows that the result of this heat imbalance is that 20% of packing does the majority of $CO_2$ capture and the function of the rest of the packing, which is 80% of a tall column, is only to enhance the rich C/N at the outlet of the absorber from 0.47 to 0.52 due to the low absorption rate near the $CO_2$ driving force pinch point (right).

The Intellectual Property described here is a compact $CO_2$ absorber, utilizing a co-current first or fog subsection, a co-current second or froth subsection and a counter-current packed section. In at least one possible embodiment, each of these sections is approximately ⅓ of the height of the entire column. The purpose is to significantly reduce the size of the $CO_2$ absorber, which is the major piece or process equipment in $CO_2$ capture, thereby reducing the cost of $CO_2$ capture. The size reduction is realized by increasing the $CO_2$ mass transfer from the gas phase to the liquid phase by 4-6 times, while also minimizing pressure drop through the absorber. This is accomplished by reducing the $CO_2$ diffusivity resistance at the gas-liquid interface and by increasing the specific surface area. Additional benefits realized with this configuration are temperature profile control and achieving a balance between the $CO_2$ absorption driving force and reaction kinetics.

In the following description, there are shown and described several preferred embodiments of the method and apparatus. As it should be realized, the method and apparatus is capable of other, different embodiments and its several details are capable of modification in various, obvious aspects all without departing from the method and apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the apparatus and method and together with the description serve to explain certain principles thereof.

Reference will now be made in detail to the present preferred embodiments of the apparatus and method, examples of which are illustrated in the accompanying drawing figures.

DETAILED DESCRIPTION

Figure 4:
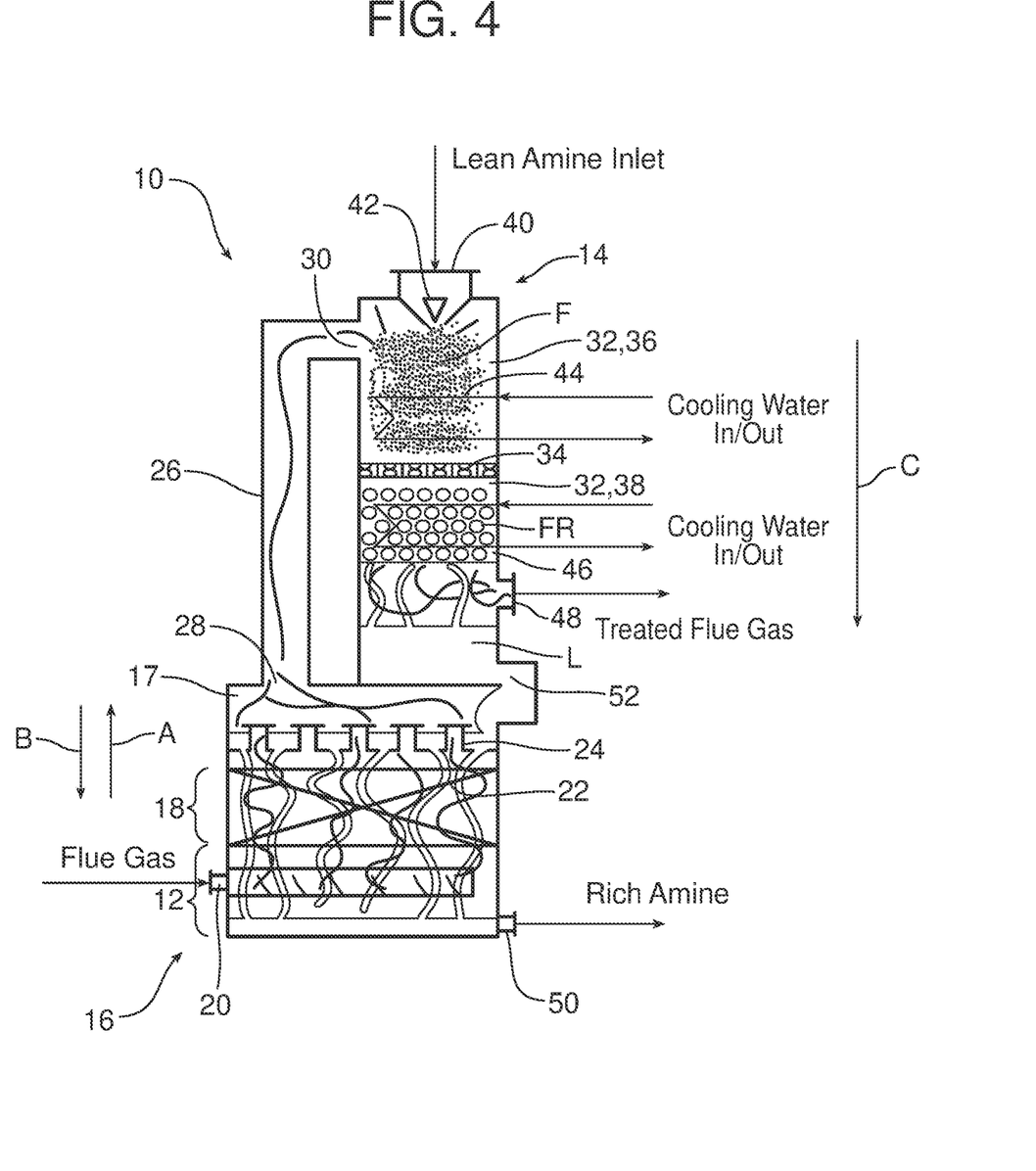
FIG. 4 is a schematic illustration of the new and improved apparatus, in the form of a compact absorber, useful in a new and improved method of capturing acid gas/$CO_2$ using an aqueous amine solvent.

As illustrated in FIG. 4, the new and improved acid gas absorber 10 includes a packing-free, co-current flue gas-lean solution section, generally designated by reference numeral 14, and a packed counter-current flue gas-liquid phase section, generally designated by reference numeral 16. In the illustrated embodiment, the co-current flue gas-lean solution section 14 at least partially overlies the packed counter-current flue gas-liquid phase section 16.

The packed counter-current flue gas-liquid phase section 16 includes an internal chamber 17. A flue gas inlet 20, in the packing-free section 12 functions to deliver flue gas to the packing section 18. Structured or random packing 22 is provided in the packing section 18 above the flue gas inlet 20. Such structured or random packing 22 is known in the art to aid in the capture of carbon dioxide from the flue gas.

A liquid distributor 24 extends across the packing section 18 above the structured or random packing 22. The function of the liquid distributor 24 will be discussed later in this document.

A gas riser 26 connects the top of the packed counter-current flue gas-liquid phase section 16 with the packing-free, co-current flue gas-lean solution section 14. More specifically, the flue gas riser 26 includes an inlet 28 connected to the packed counter-current flue gas-liquid phase section 16 and an outlet 30 connected to the co-current flue gas-lean solution section 14.

The co-current flue gas-lean solution section 14 includes a chamber 32 that is divided by a froth generator 34 into a first or fog subsection 36 and a second or froth subsection 38 wherein the first subsection overlies the second subsection. The froth generator 34 may comprise a screen or any other structure known in the art to be adapted for generating a froth from an amine solution of the type adapted to capture carbon dioxide from a flue gas stream. Such amine solutions include but are not necessarily limited to monoethanolamine (MEA), piperazine (PZ) and methyldiethanolamine (MDEA). As illustrated in FIG. 4, the top of the co-current flue gas-lean solution section 14 includes a lean amine inlet 40 having a nozzle 42 adapted to produce a fog F of lean amine solution in the first subsection 36.

In the illustrated embodiment, a first heat exchanger 44 is positioned in the first subsection 36 to allow a coolant, such as water or other appropriate fluid, to be circulated through the first subsection and a second heat exchanger 46 is positioned in the second subsection 38 to allow a coolant, such as water or other appropriate fluid, to be circulated through the second subsection. Together, the two heat exchangers 44, 46 may be operated to provide cooling to the lean amine solution and maintain an optimum operating temperature (i.e. 35-50° C.) within the co-current flue gas-lean solution section 14 in order to increase the capture efficiency of the lean amine solution. That temperature may be monitored by one or more temperature sensors within the absorber 10. Coolant flow to maintain the desired temperature range may be controlled by adjusting a flow control valve or pump (not shown).

A treated flue gas outlet 48 in the packing-free section 12 provides for the discharge of treated flue gas from the second subsection 38. A rich amine outlet 50 in the packing-free section 12 provides for the discharge of rich amine from the packing section 18 of the packed counter-current flue gas-liquid phase section 16. A discharge port 52, at the bottom of the second section 38 provides for the delivery of the liquid phase L of the amine solution from the second subsection to the packed counter-current flue gas-liquid phase section 16.

The method of operation of the acid gas absorber 10, illustrated in FIG. 4 and described above, will now be described. Untreated flue gas is delivered to the packing section of the packed counter-current flue gas-liquid phase section 16 through the flue gas inlet 20. Simultaneously, lean amine solution is delivered to the first subsection 36 of the co-current flue gas-lean solution section 14 at the lean amine inlet 40.

The flue gas delivered to the packing section 18 rises upwardly (note action arrow A) mixing with the liquid phase of the amine solution that is moving downwardly (note action arrow B) under the force of gravity. Thus, a counter-current flow of flue gas and amine solution is provided. That liquid phase of the amine solution received from the co-current flue gas-lean solution section 14 is efficiently distributed over the structured or random packing 22 by the liquid distributor 24. The structured or random packing 22 provides desired mixing and exposed surface area to promote the capture of the carbon dioxide in the flue gas by the liquid phase of the amine solution. The now carbon dioxide rich amine solution is discharged from the rich amine outlet 50 at the bottom of the packing section 18 and delivered to a stripper (not shown) for the stripping of the carbon dioxide from the amine solution. This generates a lean amine solution that is recycled back to the absorber 10 at the lean amine inlet 40.

The now partially treated flue gas enters the gas riser 26 through the inlet 28 at the top of the packed counter-current flue gas-liquid phase section 16 and is then delivered to the first subsection 36 of the co-current flue gas-lean solution section 14. There the partially treated flue gas comes into contact with the fog F of lean amine solution generated by the nozzle(s) 42 at the lean solution inlet 40. The droplets of lean amine solution forming the fog are typically, on average, less than 50 μm in diameter, thereby providing a large surface area for reaction and capture of any remaining carbon dioxide in the partially treated flue gas. The controlled operation of the first heat exchanger 44 ensures the temperature of the lean amine solution in the first subsection 36 is at the best temperature to optimize $CO_2$ capture. The lean amine solution and the flue gas are now moving in the same direction (note action arrow C) in a downwardly co-current flow toward the froth generator 34.

The froth generator 34 separating the two subsections 36, 38 of the co-current flue gas-lean solution section 14 generates a froth FR with bubbles on average of about 3-8 mm in size. Those bubble generally have a film thickness of about 10 μm or less. Those bubbles also provide a large surface area for contact with the carbon dioxide remaining in the partially treated flue gas so as to increase the efficiency of the $CO_2$ capture by the lean amine solution. About 60-80% of the $CO_2$ capture occurs in the packing-free co-current flue gas-lean solution section 14. The second heat exchanger 46 maintains the froth at an optimum temperature for carbon capture by the amine solution.

Figure 5:
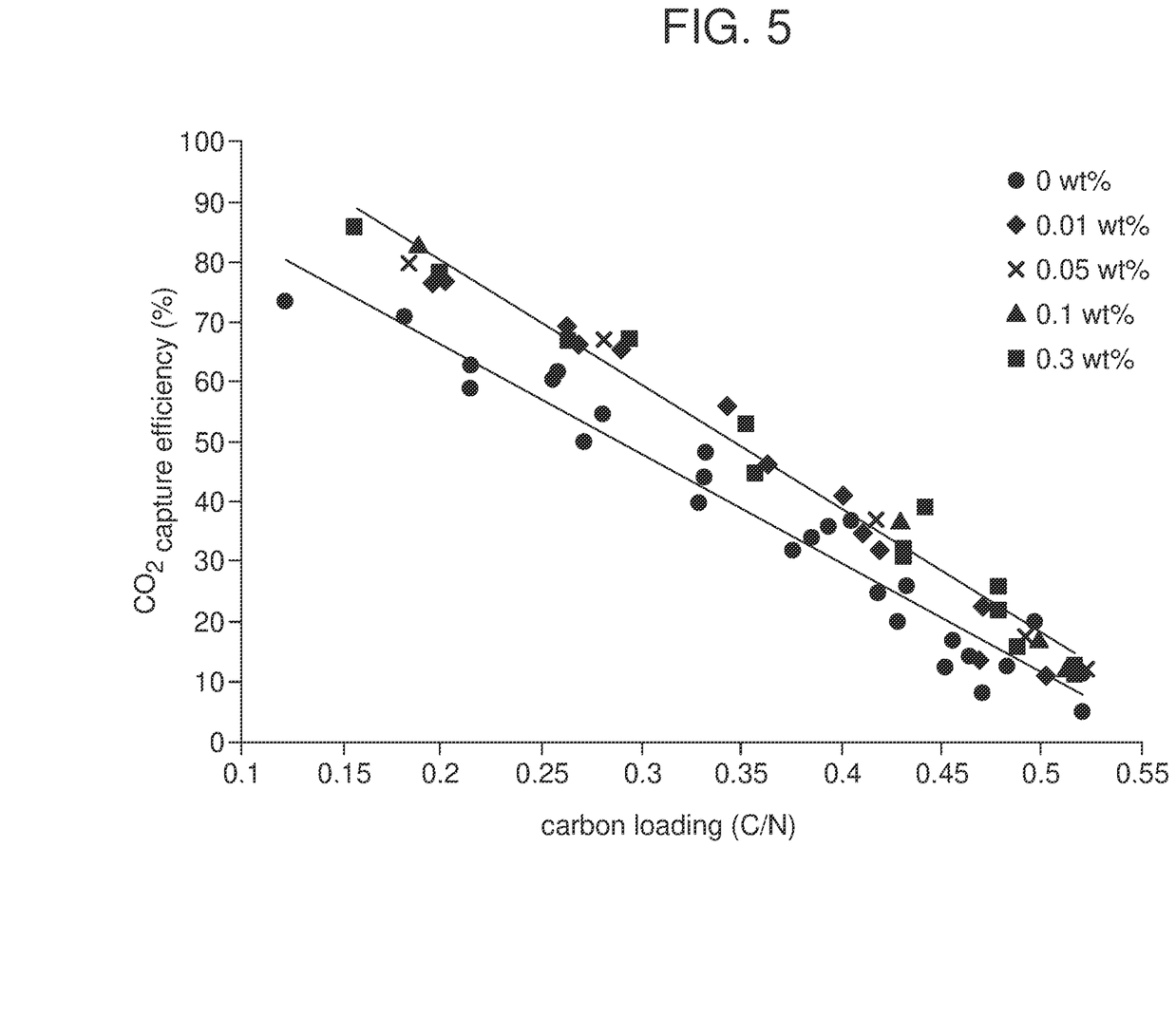
FIG. 5 is a graph of $CO_2$ capture efficiency as a function of carbon loading for 30 wt % MEA solutions containing various amounts of S554 Surfactant.
Figure 6:
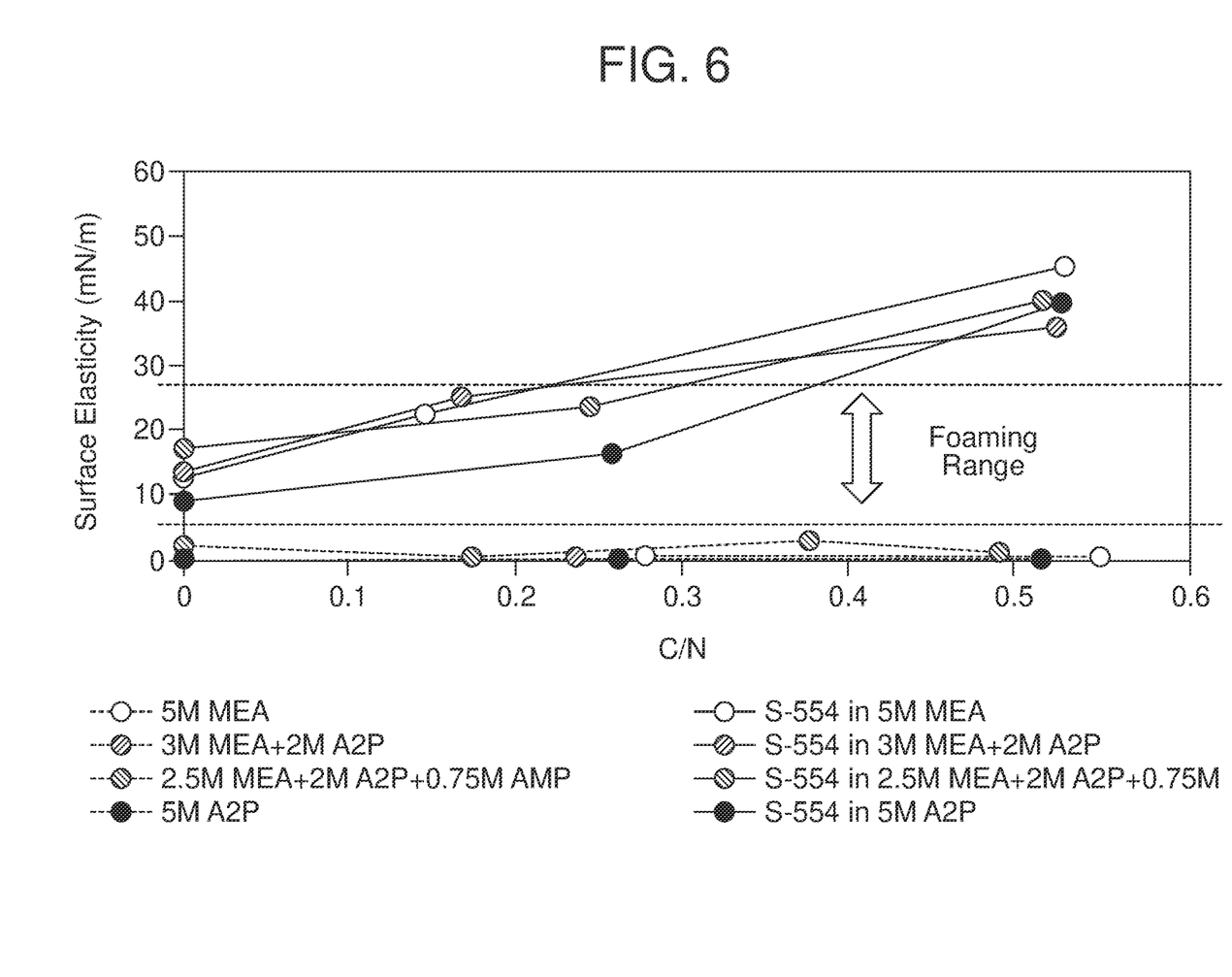
FIG. 6 is a graph of surface elasticity as a function of carbon loading (C/N) with and without S-554 in different amine solutions at room temperature.

The $CO_2$ capture efficiency and frothing action of the amine solution may be enhanced by as much as 15-20% throughout the carbon loading range by adding surfactant to change the solvent surface tension. Chemguard S-554, a perfluoro-based ethylated nonionic fluorosurfactant) is a surfactant particularly useful for this purpose (see FIGS. 5 and 6). However, other types of surfactants may be used to produce the desired results. At lean loading a significant amount of foaming is observed and foaming decreases until, at the rich condition, it becomes negligible.

The now fully treated flue gas is then discharged from the second subsection 38 at the treated flue gas outlet 48. The froth coalesces into a liquid phase at the bottom of the second subsection 38 and it is this liquid phase of amine solution that is delivered to the liquid distributor 24 and distributed over and across the structured or random packing in the internal chamber 18 of the packed counter-current flue gas-liquid phase section 16.

Summarizing, the method of capturing acid gas from flue gas may be generally described as including the steps of contacting the flue gas with a liquid phase amine solution in a packed counter-current flue gas-liquid phase section 16 of an acid gas absorber 10 to provide a partially treated flue gas and delivering the partially treated flue gas from the packed counter-current flue gas-liquid phase section 16 to a co-current flue gas-lean solution section 14 of the acid gas absorber.

The method may also include the steps of contacting the partially treated flue gas with a fog F of lean amine solution and coalescing the fog F of amine solution into the liquid phase amine solution that contacts the flue gas in the counter-current flue gas-liquid phase section 16 of the acid gas absorber 10. Further, the method may also include the steps of contacting the partially treated flue gas with a froth FR of the amine solution and coalescing the froth of the amine solution into the liquid phase amine solution that contacts the flue gas in the co-current flue gas-liquid phase section 14 of the acid gas absorber 10. Still further, as previously described above, the method may also include the steps of transferring the liquid phase amine solution from the co-current flue gas-lean solution section 14 to the counter-current flue gas-liquid phase section 16 of an acid gas absorber 10 and discharging the treated flue gas from the co-current flue gas-lean solution section.

Each of the following terms written in singular grammatical form: "a", "an", and "the", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, etc., as used herein, refers to ±10% of the stated numerical value. Use of the terms parallel or perpendicular are meant to mean approximately meeting this condition, unless otherwise specified.

It is to be fully understood that certain aspects, characteristics, and features, of the acid gas absorber and method, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the acid gas absorber and method which are illustratively described and presented in combination or sub-combination in the context or format of a single embodiment may also be illustratively described and presented in the context or format of a plurality of separate embodiments.

Although the acid gas absorber and method have been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

What is claimed:

1. An acid gas absorber, comprising:
a co-current flue gas-lean solution packing-free section;
at least one heat exchanger positioned in the co-current flue gas-lean solution packing-free section; and
a packed counter-current flue gas-liquid phase section.

2. The acid gas absorber of claim 1, wherein the co-current flue gas-lean solution packing-free section at least partially overlies the packed counter-current flue gas-liquid phase section.

3. The acid gas absorber of claim 1, wherein the co-current flue gas-lean solution packing-free section includes a lean solution inlet nozzle adapted for producing a fog of lean solution in a first subsection of the co-current flue gas-lean solution section.

4. The acid gas absorber of claim 3, further including a gas riser connecting the packed counter-current flue gas-liquid phase section with the co-current flue gas-lean solution packing-free section, said gas riser being adapted to deliver flue gas from the counter-current flue gas-liquid phase section to the first subsection of the co-current flue gas-lean solution packing-free section.

5. The acid gas absorber of claim 1, wherein the co-current flue gas-lean solution packing-free section further includes a froth generator separating a second subsection of the co-current flue gas-lean solution packing-free section from a first subsection of the co-current flue gas-lean solution packing-free section.

6. The acid gas absorber of claim 5, wherein the froth in the second subsection coalesces into a liquid phase that passes through a discharge port from the co-current flue gas-lean solution packing-free section to the packed counter-current flue gas-liquid phase section.

7. The acid gas absorber of claim 1, wherein said at least one heat exchanger is positioned in a first subsection of the co-current flue gas-lean solution packing-free section.

8. The acid gas absorber of claim 1, wherein said at least one heat exchanger includes a first heat exchanger positioned in a first subsection of the co-current flue gas-lean solution packing-free section and a second heat exchanger positioned in a second subsection of the co-current flue gas-lean solution packing-free section.

9. The acid gas absorber of claim 1, further including structured packing or random packing in the packed counter-current flue gas-liquid phase section.

10. The acid gas absorber of claim 9, further including a liquid distributor overlying the structured packing or random packing in the packed counter-current flue gas-liquid phase section.

11. The acid gas absorber of claim 10, further including a flue gas inlet in the packed counter-current flue gas-liquid phase section and located below the structured packing or random packing.

12. The acid gas absorber of claim 11, further including a rich amine outlet in the packed counter-current flue gas-liquid phase section and located below the flue gas inlet.

* * * * *